US012177647B2

(12) United States Patent
Yang et al.

(10) Patent No.: US 12,177,647 B2
(45) Date of Patent: Dec. 24, 2024

(54) HEADPHONE RENDERING METADATA-PRESERVING SPATIAL CODING

(71) Applicants: DOLBY LABORATORIES LICENSING CORPORATION, San Francisco, CA (US); DOLBY INTERNATIONAL AB, Dublin (IE)

(72) Inventors: Ziyu Yang, Beijing (CN); Lie Lu, Dublin, CA (US); Heiko Purnhagen, Sundbyberg (SE); Jeremy Grant Stoddard, Gosford (AU); Dirk Jeroen Breebaart, North Sydney (AU)

(73) Assignees: DOLBY LABORATORIES LICENSING CORPORATION, San Francisco, CA (US); DUBLIN INTERNATIONAL AB, Dublin (IE)

( * ) Notice: Subject to any disclaimer, the term of this patent is extended or adjusted under 35 U.S.C. 154(b) by 0 days.

(21) Appl. No.: 18/690,133

(22) PCT Filed: Sep. 8, 2022

(86) PCT No.: PCT/US2022/042949
§ 371 (c)(1),
(2) Date: Mar. 7, 2024

(87) PCT Pub. No.: WO2023/039096
PCT Pub. Date: Mar. 16, 2023

(65) Prior Publication Data

US 2024/0334146 A1 Oct. 3, 2024

Related U.S. Application Data

(60) Provisional application No. 63/374,884, filed on Sep. 7, 2022, provisional application No. 63/249,733, filed on Sep. 29, 2021.

(30) Foreign Application Priority Data

Sep. 9, 2021 (WO) ................ PCT/CN2021/117401
Jul. 22, 2022 (WO) ................ PCT/CN2022/107335

(51) Int. Cl.
*H04S 7/00* (2006.01)

(52) U.S. Cl.
CPC ........... *H04S 7/302* (2013.01); *H04S 2400/11* (2013.01); *H04S 2420/01* (2013.01)

(58) Field of Classification Search
None
See application file for complete search history.

(56) References Cited

U.S. PATENT DOCUMENTS 9,933,989 B2 4/2018 Tsingos
9,973,874 B2 5/2018 Stein
(Continued)

FOREIGN PATENT DOCUMENTS

WO 2015017037 A1 2/2015
WO 2016094674 A1 6/2016
(Continued)

OTHER PUBLICATIONS

U.S. Appl. No. 61/865,072, filed Aug. 12, 2013, 151 pages.

*Primary Examiner* — Qin Zhu

(57) ABSTRACT

Systems and methods for preserving headphone rendering mode (HRM) in object clustering are described. In an embodiment, an object-based audio data processing system includes a processor configured to receive a plurality of audio objects, wherein an audio object of the plurality of audio objects is associated with respective object metadata that indicates respective spatial position information and an HRM; determine a plurality of cluster positions by applying an extended hybrid distance metric to a spatial coding algorithm to calculate a partial loudness for each of the audio (Continued)

600 objects; render the audio objects to the cluster positions to form a plurality of clusters by applying the extended hybrid distance metric to the spatial coding algorithm to calculate object-to-cluster gains; and transmit the clusters to a spatial reproduction system.

19 Claims, 8 Drawing Sheets

(56) References Cited

U.S. PATENT DOCUMENTS

| | | | |
|---|---|---|---|
| 10,129,648 | B1 | 11/2018 | Hernandez Santisteban |
| 10,231,073 | B2 | 3/2019 | Stein |
| 10,609,503 | B2 | 3/2020 | Stein |
| 10,764,704 | B2 | 9/2020 | Seldess |
| 10,779,106 | B2 | 9/2020 | Chen |
| 10,861,467 | B2 | 12/2020 | Torres |
| 11,032,661 | B2 | 6/2021 | Sandler |
| 11,089,428 | B2 | 8/2021 | Salehin |
| 2015/0332680 | A1 | 11/2015 | Crockett |
| 2016/0358618 | A1 | 12/2016 | Chen |
| 2017/0339506 | A1 | 11/2017 | Chen |
| 2017/0366914 | A1 | 12/2017 | Stein |
| 2018/0227691 | A1* | 8/2018 | Chen ..................... G10L 19/008 |
| 2018/0357038 | A1 | 12/2018 | Olivieri |
| 2019/0182612 | A1* | 6/2019 | Chen .......................... H04S 7/30 |
| 2020/0382892 | A1 | 12/2020 | Mehta |
| 2021/0132894 | A1 | 5/2021 | Tsingos |

FOREIGN PATENT DOCUMENTS

| | | | |
|---|---|---|---|
| WO | 2017027308 | A1 | 2/2017 |
| WO | 2018017394 | A1 | 1/2018 |
| WO | 2022177871 | A1 | 8/2022 |

* cited by examiner

HEADPHONE RENDERING METADATA-PRESERVING SPATIAL CODING

CROSS-REFERENCE TO RELATED APPLICATIONS

This application is the U.S. national stage entry of International Patent Application No. PCT/US2022/042949 filed Sep. 8, 2022, which claims the benefit of International Patent Application No. PCT/CN2021/117401, filed Sep. 9, 2021, U.S. Provisional Patent Application No. 63/249,733, filed Sep. 29, 2021, International Patent Application No. PCT/CN2022/107335, filed Jul. 22, 2022, and U.S. Provisional Patent Application No. 63/374,884, filed Sep. 7, 2022; all of which are incorporated herein by reference in their entirety.

FIELD

This application relates generally to systems and methods for preserving headphone rendering mode (HRM) in object clustering.

BACKGROUND

An object-based audio system implements an object-based audio format that includes both beds and objects. Audio beds refer to audio channels that are meant to be reproduced in predefined, fixed locations while audio objects refer to individual audio elements that may exist for a defined duration in time but also have spatial information of each object, such as position, size, and the like. During transmission, beds and objects are sent separately and used by a spatial reproduction system to recreate the artistic intent. These reproduction systems often include a variable number of speakers or headphones.

SUMMARY OF THE DESCRIPTION

General, an object clustering process (e.g., employed within an object-based audio system) includes two steps: 1) determining the cluster position and associated metadata ("cluster centroid determination") and 2) calculating the object to cluster gains and generate the clusters ("cluster generation"). In some embodiments, cluster centroid determination (the first step) includes a process to determine the cluster centroid by selecting the most perceptually important objects where both the loudness and content type are considered when measuring the importance of an object. In some embodiments, cluster generation (the seconds step) includes generating clusters by calculating the object-to-cluster gains and applying the gains to input objects. In some embodiments, cluster generation includes a process to calculate the gains by minimizing a cost function by considering position correctness, distance, and amplitude preservation.

However, due to the bandwidth limitation of distribution and transmission systems, transmitting the original object-based audio signal, which may contain hundreds of individual objects, becomes challenging. In some embodiments, the described object clustering system employs a series of clustering techniques, some are under the label of 'Spatial Coding', to reduce the complexity of the audio scene. Generally, these techniques are employed to reduce the number of input objects and beds into a set of output objects (hereafter referred to as "clusters") via clustering with minimum impact on audio quality. Moreover, employing the described object clustering system reduces storage and archival requirements for content because the resulting content asset is smaller in size; improves distribution efficiency including a reduction in a number of channels/objects/clusters, which typically translates directly into a reduced bit rate for distribution; and reduces rendering complexity because the complexity of a renderer typically increases linearly with the number of objects/channels/clusters that need to be rendered.

Accordingly, the present disclosure provides systems and methods for preserving HRM in object clustering. In some embodiments, these systems and methods include operations for receiving a plurality of audio objects, wherein an audio object of the plurality of audio objects is associated with respective object metadata that indicates respective spatial position information and an HRM; determining a plurality of cluster positions by applying an extended hybrid distance metric to a spatial coding algorithm to calculate a partial loudness for each of the audio objects; rendering the audio objects to the cluster positions to form a plurality of clusters by applying the extended hybrid distance metric to the spatial coding algorithm to calculate object-to-cluster gains; and transmitting the clusters to a spatial reproduction system.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more embodiments of the present disclosure are set forth in the accompanying drawings and the description below. Other features and advantages of the present disclosure will be apparent from the description and drawings, and from the claims.

BRIEF DESCRIPTION OF DRAWINGS

The present disclosure is illustrated by way of example, and not by way of limitation, in the figures of the accompanying drawings and in which reference numerals refer to similar element and in which.

DETAILED DESCRIPTION

Figure 1:
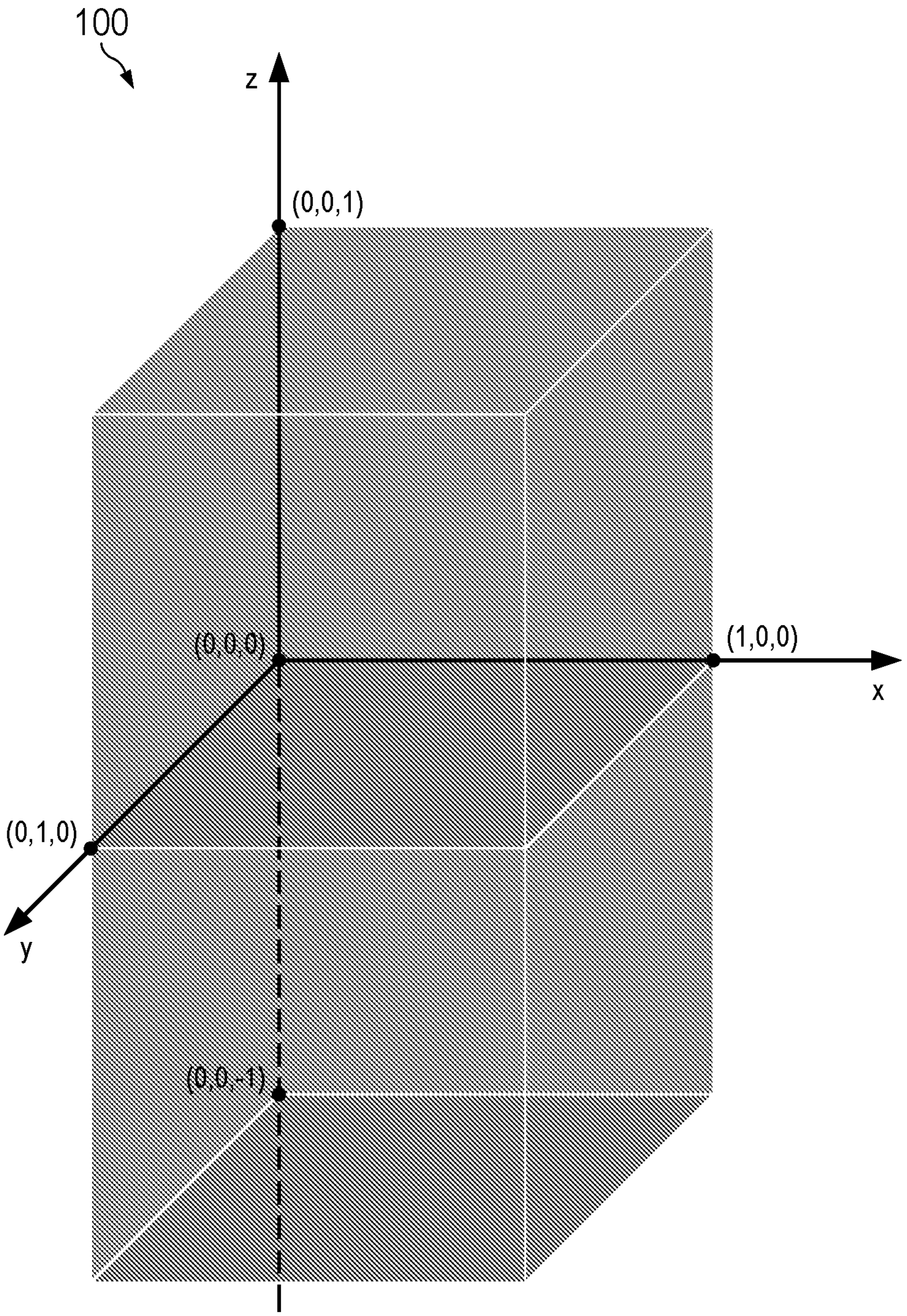
FIG. 1 depicts extended Atmos coordinates with negative z.

Before any embodiments of the disclosure are explained in detail, it is to be understood that the disclosure is not limited in its application to the details of embodiment and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting, and coupling. Further, "connected" and "coupled" are not restricted to physical or mechanical connections or couplings, and can include electrical or hydraulic connections or couplings, whether direct or indirect.

In some embodiments, the described object clustering system uses metadata that includes a description of spatial position and optionally an indication of rendering requirements (e.g., snap and zone mask in speaker rendering scenarios). In a headphone rendering scenario, for example, an object is associated with metadata describing the HRMs. These HRMs are typically created by the artists in the content creation phase, and indicate, for example, whether the virtualization techniques should be applied or not (i.e., "bypass" mode) for binaural headphone rendering or a desired room effects for virtualization. As an example, an object can carry the HRM with either "near", "far", or "middle" to indicate three types of scaling of the distance from object to the head center, which enables refined control of the amount of virtual room effect applied in binaural headphone rendering. Generally, HRMs that include "bypass", "near", "far", and "middle" should be preserved through clustering to preserve the artist's intention. In some embodiments, the described object clustering system employs multiple "buckets" where each bucket represents a unique type of metadata to be preserved. In the use case for headphone metadata preservation, for example, four buckets can be employed to represent the four HRMs, "bypass", "near", "far", and "middle".

Generally, the described object clustering system employs an object clustering process that includes three steps. First, audio objects having metadata to be preserved are allocated to one bucket, and the rest of the objects are allocated together into another bucket. Some embodiments employ a larger number of buckets where each bucket represents a unique combination of metadata that requires preservation. Second, a number of clusters are assigned for each bucket through a clustering process, subject to an overall (maximum) number of available clusters and an overall error criterion; and subsequently, objects are clustered according to the number of clusters in each bucket. Finally, clusters from the buckets are combined to generate a final clustering result. In some embodiments, one of two bucket separation modes are implemented: fuzzy bucketing mode, in which leakages are allowed between buckets, or hard bucketing mode, in which leakages are not allowed between buckets.

In some embodiments, a hybrid mode is employed to preserve various types of metadata with the consideration of their relationship. For example, each type of metadata is considered as a bucket, which are categorized into several bucket groups. Within each bucket group, "leakages" are allowed among the buckets; however, leakages should be prevented for the buckets in different groups.

As an example, in the HRM preservation scenario described above, two bucket groups can be placed: group 1 for bypass objects and the group 2 for objects whose HRM is near, far, or middle. In some embodiments, the near/far/middle objects are placed in one bucket group because they are similar in terms of rendering procedures (especially for one object/cluster with different HRM where the only difference is the associated room acoustics). In some embodiments, the HRM is considered as a bucket/bucket group that has specific semantic meaning, much like using dialog/non-dialog buckets in a dialog preservation use case. In some embodiments, the HRM is interpreted as an additional attribute of spatial distance as it is closely related to the spatial information of the object in binaural rendering systems. Specifically, the object position in relation to the head center is determined by both the spatial position metadata and the HRM of the object. In some embodiments, the position metadata determines the direction, while the HRM acts as a scaling factor on the distance to head center.

Generally, a rendering of object-based audio content prior to and after clustering needs to be sufficiently similar or perceptually equivalent to preserve artistic intent, which can present a technical difficulty. In speaker rendering systems, for example, the object position is read from the positional vectors in the metadata while the HRM is discarded. In other words, the HRM can only be consumed by binaural rendering systems. Therefore, in some embodiments, to ensure good performance for both rendering systems, two targets are jointly considered:

(1) positional/directional correctness where the object as reconstructed from clusters should be as close as possible to the original object position, and (2) HRM correctness where the object should be clustered to the clusters with the same or perceptually similar HRM to ensure a good binaural/headphone rendering performance.

where (1) is the essential factor for both rendering systems while (2) is important for binaural rendering systems only.

Another technical difficulty is the significant likelihood of coincident objects. Here "coincident" includes when two objects have approximately equal positional metadata in Cartesian form while containing individual HRM (which could be different). Such cases lead to a dilemma in the Spatial Coding algorithm. On one hand, assigning multiple clusters with the same centroid position and different HRM is ideal for this case, but would lead to a lack of clusters for other regions/directions. On the other hand, if only one cluster were selected for the coincident object position, HRM leakages would be unavoidable. Therefore, centroid selection for coincident objects is carefully handled.

In some embodiments, the proposed Spatial Coding method employs an extended hybrid distance metric that combines the Euclidean and angular distance, which are commonly used for speaker and binaural rendering systems, respectively. Further, in some embodiments, the HRM distance is defined and integrated into the hybrid distance to form the extended hybrid distance. In some embodiments, the extended hybrid distance is applied to the Spatial Coding algorithm to ensure the positional correctness as the primary task while also considering the preservation of HRM metadata. While the description focuses on the HRM preservation scenario, the hybrid mode is applicable to general cases.

Definitions

Unless otherwise defined, all technical terms used herein have the same meaning as commonly understood by one of ordinary skill in the art to which the present subject matter belongs. As used in this specification and the appended claims, the singular forms "a," "an," and "the" include plural references unless the context clearly dictates otherwise. Any reference to "or" herein is intended to encompass "and/or" unless otherwise stated.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of embodiments of the present disclosure.

As used herein, the term "audio beds" refers to audio channels that are meant to be reproduced in predefined, fixed locations while audio objects refer to individual audio elements that may exist for a defined duration in time but also have spatial information of each object, such as position, size, and the like.

As used herein, the term "clusters" refers to a set of output objects generated by reducing the number of input objects and beds via clustering with minimum impact on audio quality.

Hybrid Distance—Euclidean and Angular Distance

FIG. 1 depicts extended Atmos coordinates with negative z 100. In some embodiments, Cartesian coordinates, as depicted in FIG. 1, are used for representing audio object positions, hereinafter referred to as Coordinate System 1 (CS-1). CS-1 uses the x-y plane to represent the listener's plane, where the origin is placed on the left-most and front-most position. The x, y, z-axes then point toward the right, back and top, respectively. If valid values of the three coordinates are restricted to x, y, z $\in[0,1]$, then the set of valid positions form the Atmos cube. In some use-cases, to represent an object below the listener's plane, negative z is allowed and z can be extended to $[-1,1]$.

Consider two objects i, j whose spatial positions in the CS-1 are represented by the two positional vectors $p_i=[x_i, y_i, z_i]^T$ and $p_j=[x_j, y_j, z_j]^T$, respectively. The Euclidean distance between objects i, j, denoted by $\tilde{d}_{euc}$ (i,j), can be calculated according to:

$$\tilde{d}_{euc}(i,j)=\sqrt{(p_i-p_j)^T(p_i-p_j)}=\sqrt{(x_i-x_j)^2+(y_i-y_j)^2+(z_i-z_j)^2} \quad (1)$$

The system can restrict the Euclidean distance to [0,1] for convenience of future processing according to:

$$d_{euc}=\min(1,\tilde{d}_{euc}(i,j)) \quad (2)$$

Figure 2:
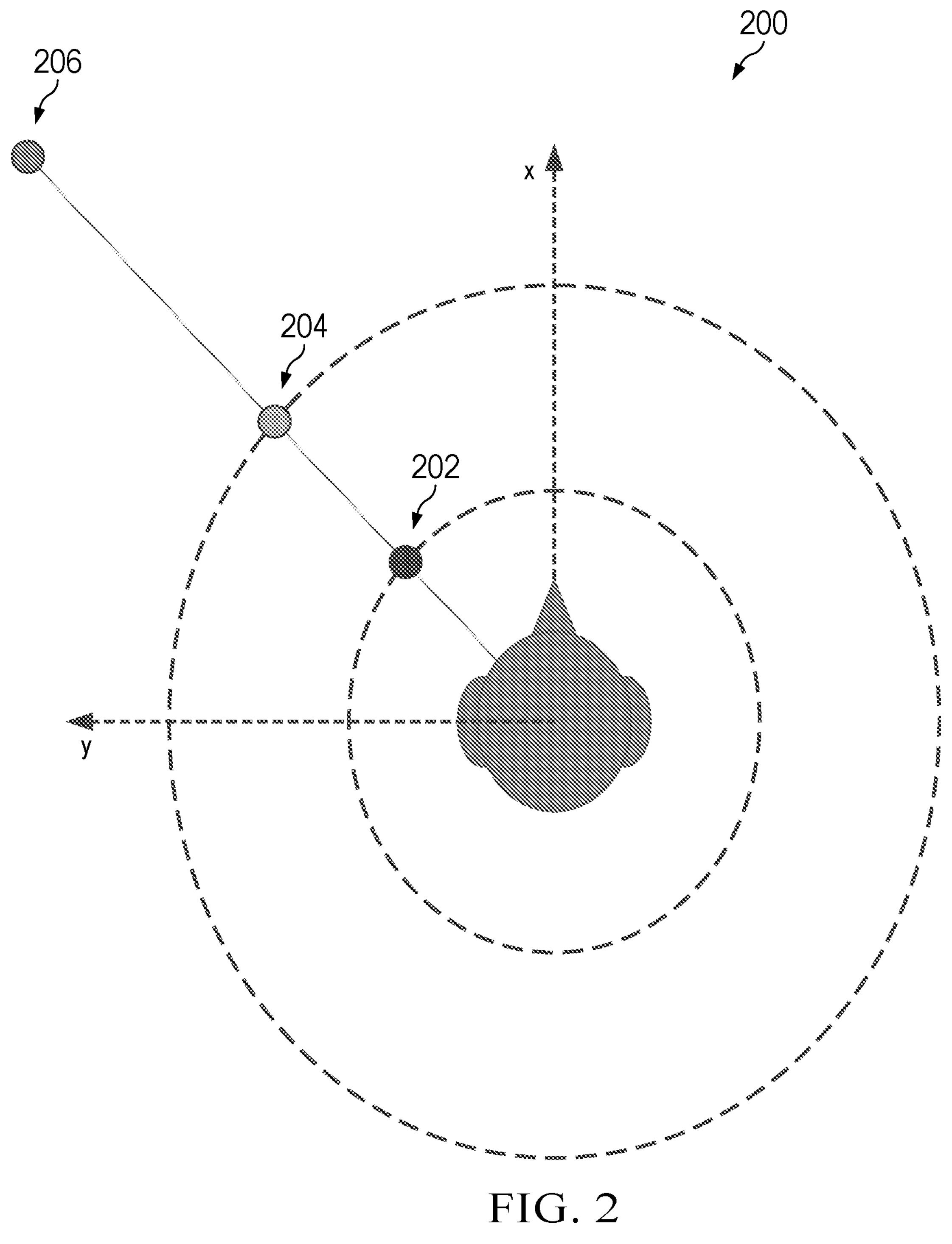
FIG. 2 depicts a Spherical system used in embodiments of a headphone virtualizer according to an implementation of the present disclosure.

In binaural rendering systems, a head-centered coordinate system can be employed. In some embodiments, the head-centered coordinate system takes the head center as the origin (hereinafter referred to as Coordinate System 2 (CS-2)). FIG. 2 depicts a Spherical system 200 used in embodiments of a headphone virtualizer. The x-y plane (listener's plane) of CS-2, illustrated in FIG. 2, shows where the x, y axes point toward the front and left direction respectively, and the z axis points in an upwards direction above the head. The valid values of the three coordinates become x', y', z' $\in[-1,1]$. In some embodiments, for objects with the same positional metadata but different HRM, the binaural rendering system will place them in the same direction while assigning different distances with respect to the head center (the origin in CS-2) according to their HRM. The circles 202, 204, and 206 illustrate three objects with the same positional vector but having different HRM: "near", "middle", and "far", respectively.

CS-1 can be transformed to CS-2. Specifically, the arbitrary positional vector $p_i=[x_i, y_i, z_i]^T$ in CS-1 can be converted to $p_i'=[x'_i, y'_i, z'_i]^T$ in CS-2 via:

$$\begin{bmatrix} x_i' \\ y_i' \\ z_i' \end{bmatrix}=\begin{bmatrix} 0 & -2 & 0 \\ -2 & 0 & 0 \\ 0 & 0 & 1 \end{bmatrix}\begin{bmatrix} x_i \\ y_i \\ z_i \end{bmatrix}+\begin{bmatrix} 1 \\ 1 \\ 0 \end{bmatrix} \quad (3)$$

In CS-2, it is convenient to measure the directional difference for two objects with respect to the head center. Suppose the positional vectors of object i, j in CS-2 are $p'_i$, $p'_j$, respectively. The angular difference of objects i, j, denoted by θ(i,j), can be calculated according to:

$$\theta(i,j)=\arccos\frac{p_i'^T p_j'}{\sqrt{\|p_i'\|\|p_i'\|}} \quad (4)$$

The angular distance of objects i, j, denoted by $d_{ang}$(i, j), can be obtained by converting θ(i, j) to [0,1]. Since $\theta(i,j)\in[0,\pi]$, the $d_{ang}$ (i, j) can be defined according to:

$$d_{ang}(i,j)=1/\pi\theta(i,j) \quad (5)$$

Alternatively, non-linear functions can be applied. For example:

$$d_{ang}(i,j)=\sin \tfrac{1}{2}\theta(i,j) \quad (6)$$

Without loss of generality, in some embodiments, equation (5) is used for calculating the angular distance $d_{ang}$ (i, j). Equation (5) is hereinafter used for this calculation.

Hybrid Distance without HRM

When both the Euclidean distance $d_{euc}$(i,j) and angular distance $d_{ang}$(i, j) are determined, the hybrid distance without considering HRM, denoted by $d_1$, can be defined according to:

$$d_1(i,j)=s d_{ang}(i,j)+(1-s)d_{euc}(i,j) \quad (7)$$

In some embodiments, the scaler variable s is defined according to:

$$s=1-d_{euc}(i,j) \quad (8)$$

However, the scaler variable s may be defined according to an alternative definition.

In some embodiments, the hybrid distance $d_1$ is a combination of Euclidean and angular distance, where the coefficient s, which is referred to as the "scaler" hereinafter, reflects the contribution amount of angular distance. Since $d_{euc}$, $d_{ang}\in[0,1]$, we have $d_1\in[0,1]$.

Figure 3:
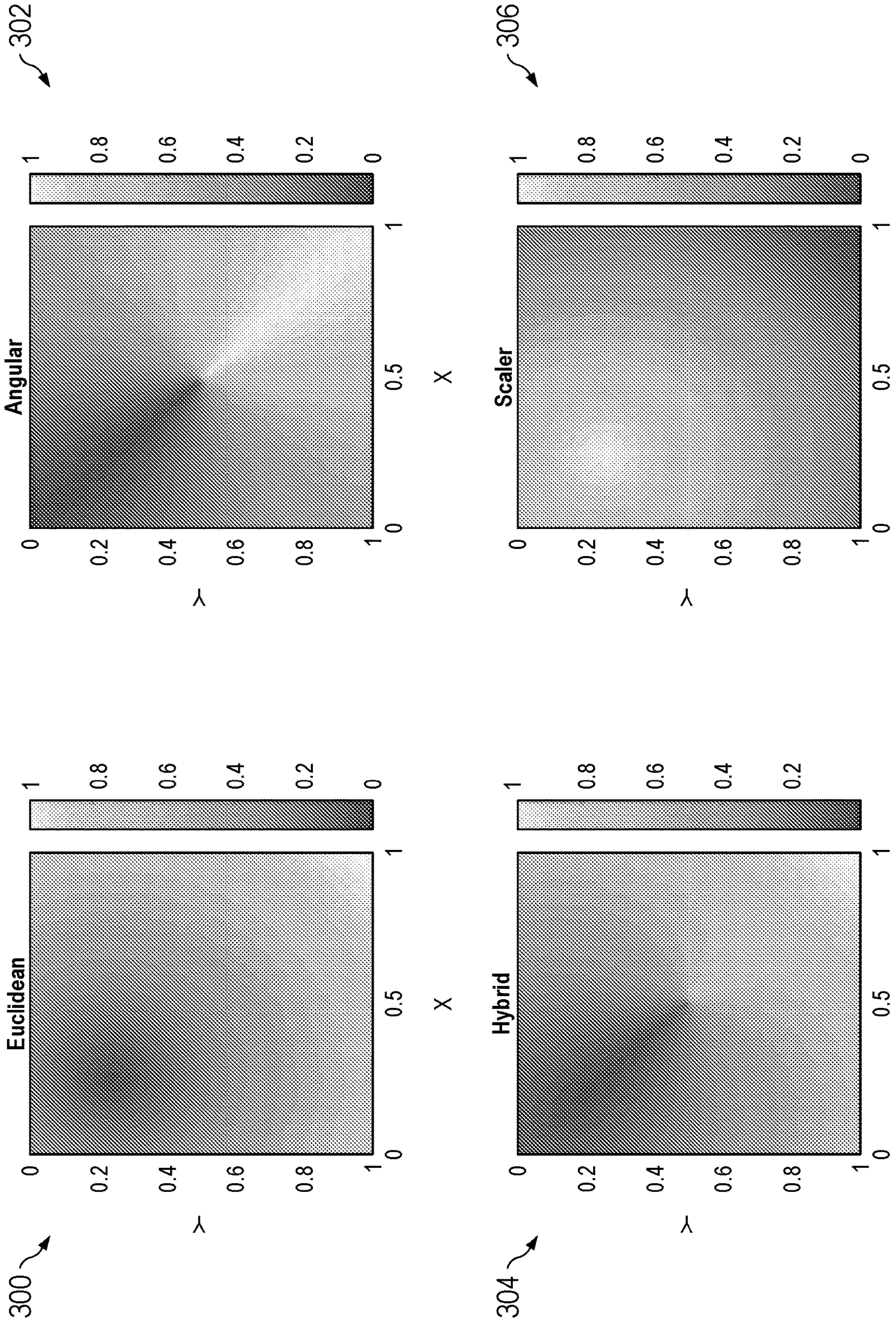
FIG. 3 depicts the distance pattern of a Euclidean distance, an angular distance, a hybrid distance, and a pattern of scaler with a reference object.

FIG. 3 depicts the distance pattern of the Euclidean distance 300, angular distance 302, hybrid distance (without HRM) 304, and pattern of scaler s 306 with reference object located at (0.25, 0.25, 0). According to the definition of $d_{euc}$, $d_{ang}$ and $d_1$, the distance patterns 300 can be obtained for any given reference position as depicted in FIG. 3, where the reference position is $p_i$=(0.25, 0.25, 0).

In some embodiments, the masking level h is further defined as a decreasing function of distance d, for example:

$$h = \begin{cases} \cos\frac{\pi}{2}\frac{d}{\tau}, & 0 < d \le \tau \\ 0, & \text{else} \end{cases} \quad (9)$$

where the distance d can be $d_{euc}$, $d_{ang}$ or $d_1$.

Figure 4:
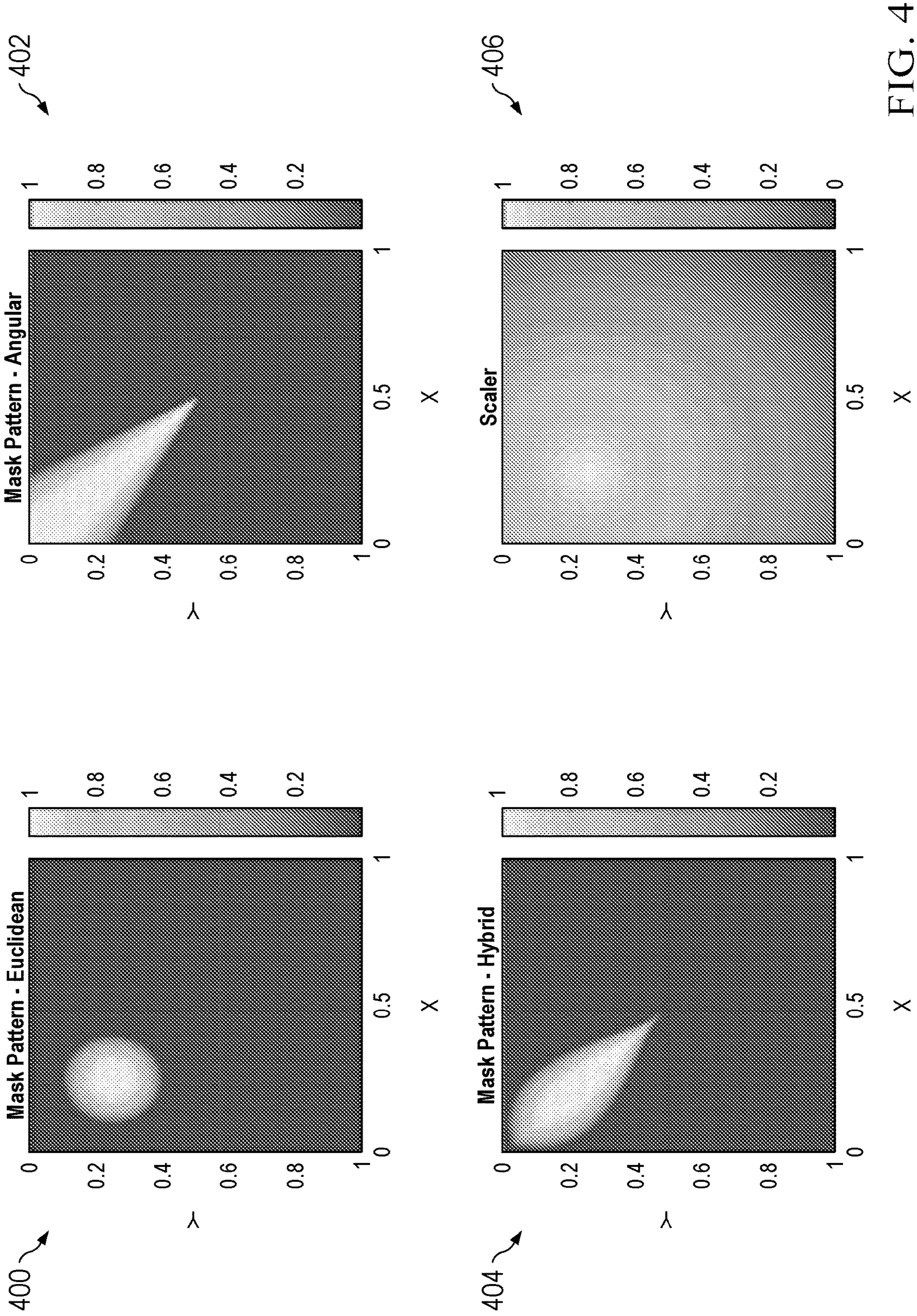
FIG. 4 depicts a masking pattern of the Euclidean distance, angular distance, hybrid distance, and the pattern of scaler.

FIG. 4 depicts the masking pattern of the Euclidean distance 400, angular distance 402, hybrid distance (without HRM) 404. FIG. 4 illustrates the masking pattern for $d_{euc}$, $d_{ang}$ and $d_1$ with $\tau$=0.15, 0.1 and 0.1, respectively. The pattern of scaler s 306 is also included in FIG. 4 for reference.

Hybrid Distance with HRM

In some embodiments, the hybrid distance is extended by taking the HRM difference into consideration. In some embodiments, an HRM distance proto captures the HRM difference of two coincident objects that contain individual HRMs. Then, the extended hybrid distance $d_2 \in [0,1]$ is constructed by integrating the HRM distance proto to the hybrid distance $d_1$.

In some embodiments, the HRM is represented by the HRM index. Without loss of generality, the HRM "bypass", "near", "far" and "middle" are represented by the HRM index 1, 2, 3 and 4, respectively hereinafter. In some embodiments, a known function h [j] is employed to map the object index j to the HRM index h [j]. That is, the HRM of object j is represented by the HRM index h $[j] \in \{1,2,3,4\}$.

HRM Distance Proto

Given two coincident objects, two kinds of HRM distance proto can be defined from different perspectives. First, from the masking point of view, two objects might be mutually masked if they are close enough to each other. The masking amount increases as the distance of the two objects decreases. In the binaural rendering system (e.g., using CS-2), two coincident objects with different HRM can be interpreted as two objects with the same direction but different distance with regards to the head center. That means, for the coincident objects, the "far" object is closer to the "middle" object than the "near" object. Therefore, the relative distance between HRMs can be defined and represented by the matrix M. An example setup for M is:

$$M = [m_{u,v}] = \begin{bmatrix} 0 & 1 & 1 & 1 \\ 1 & 0 & 0.95 & 0.8 \\ 1 & 0.95 & 0 & 0.9 \\ 1 & 0.8 & 0.9 & 0 \end{bmatrix} \quad u, v = 1, \ldots, 4 \quad (10)$$

where the row/column index represents the HRM index. For two coincident objects i, j with HRM indexes h[i]=u,h[j]=v, the HRM distance can be defined by $m_{h[i],h[j]}=m_{u,v}$. A higher value of $m_{u,v}$ indicates a lower masking amount between the HRM indexes u and v. It should be noted that the matrix M is symmetric, i.e., $m_{u,v}=m_{v,u}$. For example, the HRM distance of the two coincident objects with the HRM "near" (HRM index=2) and "far" (HRM index=3) is equal to $m_{2,3}=m_{3,2}=0.95$.

Second, from the rendering/clustering perspective, rendering the object to coincident clusters would lead to leakages across different HRMs. The cost of leakage between two coincident objects with HRM can be defined and represented by the matrix L. An example setup for L is:

$$L = [l_{u,v}] = \begin{bmatrix} 0 & 0.2 & 04 & 04 \\ 0.1 & 0 & 0.2 & 0.05 \\ 0.4 & 04 & 0 & 0.1 \\ 0.2 & 0.1 & 0.1 & 0 \end{bmatrix} \quad u, v = 1, \ldots, 4 \quad (11)$$

where the meaning of row/column index is the same as for the matrix M. A higher value of $l_{u,v}$ indicates a higher cost for object with HRM index v leaking to coincident cluster with HRM index u. It should be noted that the matrix L is asymmetric in general so that the leakage cost can be different between the HRM index "from v to u" and "from u to v". For example, $l_{3,2}=0.4$, $l_{4,2}=0.1$ means the cost of a "near" object leaking to coincident "far" and "middle" clusters is equal to 0.4 and 0.1, respectively. However, the cost of "middle" to "near" is equal to $l_{2,4}=0.05 \neq l_{4,2}$.

The two HRM distance perspectives and the consequent entries of matrixes M, L will be applied to different phases of the Spatial Coding algorithm, which will be discussed in the Object Clustering using Hybrid Distance section below.

Integrating HRM Distance Proto to Hybrid Distance

The HRM difference described by the matrix M or L can be generalized for two arbitrary objects. Specifically, given two objects i, j with HRM index u=h[i], v=h[j], respectively, two types of HRM distance of object i, j can be defined according to:

$$d_{hrm}(i,j)=m_{u,v} \quad (11)$$

$$d'_{hrm}(i,j)=l_{u,v} \quad (12)$$

In some embodiments, the extended hybrid distance of object i, j, denoted by $d_2$ (i, j), is defined by a combination of the hybrid distance $d_1$ (i, j) and HRM distance $d_{hrm}$ (i, j):

$$d_2(i,j)=(1-\alpha_m d_{hrm}(i,j))d_1(i,j)+\alpha_m d_{hrm}(i,j) \quad (13)$$

In some embodiments, if the HRM distance $d'_{hrm}(i, j)$ is used, the extended hybrid distance is defined according to:

$$d'_2(i,j)=(1-\alpha_l d'_{hrm}(i,j))d_1(i,j)+\alpha_l d'_{hrm}(i,j) \quad (14)$$

where $\alpha_m$, $\alpha_l \in (0,1)$ are the coefficients of HRM distance, which will be set for step 1 and step 2 of the Spatial Coding algorithm, respectively.

Figure 5:
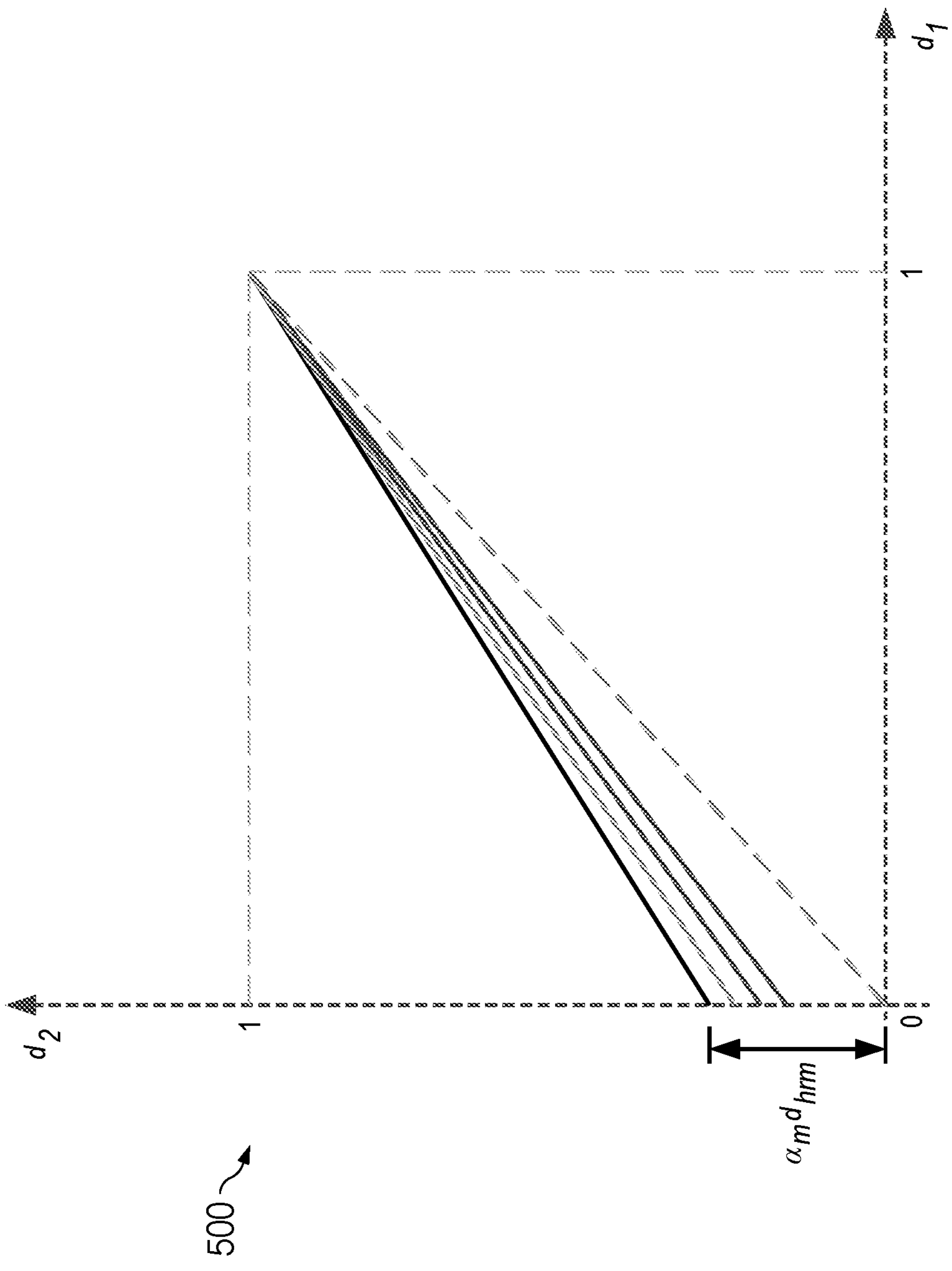
FIG. 5 depicts a mapping from a hybrid distance to an extended hybrid distance.

FIG. 5 depicts a mapping 500 from hybrid distance $d_1$ to the extended hybrid distance $d_2$ with various $d_{hrm}$ values. The mapping from $d_1$ to $d_2$ with different $d_{hrm}$ 500 shows the different $d_{hrm}$ values represented by the different lines. The y-intercepts of the lines are equal to $\alpha_m d_{hrm}$(i, j). It can be observed that as $d_1$ increases, the lines become closer to the one-to-one mapping (dashed line) and converge at the same point (1,1). This implies the HRM distance will only make a significant difference if the hybrid distance $d_1$ is small enough, otherwise the final hybrid distance $d_2$ will be dominated by $d_1$.

Object Clustering Using Hybrid Distance-Overview of Clustering Framework

In some embodiments, I input objects are assumed where each has time-varying metadata containing spatial position and HRM. In some embodiments, the maximum cluster count denoted by/is fixed, which is usually preset according to the available bandwidth or expected bitrate in a real use case. In some embodiments, the clustering is performed on a frame-by-frame basis.

Figure 6:
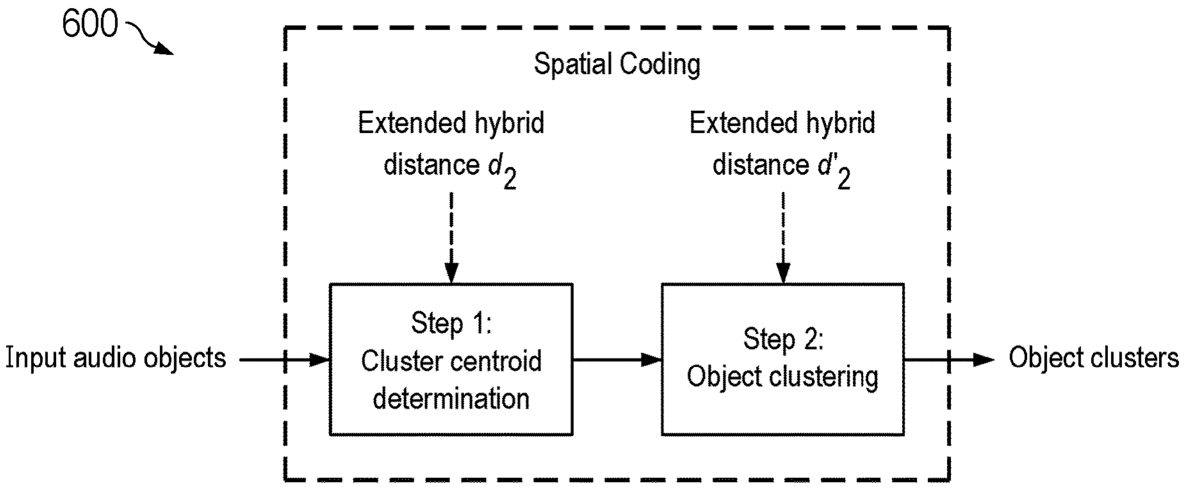
FIG. 6 depicts an algorithm using extended hybrid distance that can be employed by the described object clustering system.

As mentioned in above, in some embodiments, the clustering consists of two steps: cluster determination and object-to-cluster gain calculation. The distance of two objects/clusters plays an important role for both steps. This section presents the new Spatial Coding algorithm using the extended hybrid distance. The framework is shown in FIG. 6, which depicts an algorithm 600 using extended hybrid distance that can be employed by the described object clustering system.

Cluster Centroid Selection Using Hybrid Distance

In some embodiments, in step 1 of clustering, the centroid positions and HRM will be determined one by one until the target cluster count is reached. In some embodiments, in each iteration, the centroid position and HRM is determined by an iterative greedy approach, i.e., picking the object with maximum partial loudness. Specifically, for any given object i with excitation $E_i$, the specific loudness $N'_i(b)$ of object i in auditory filter b can be calculated according to:

$$N'_i(b) = \left(A + \sum_j E_j(b)\right)^\alpha - \left(A + \sum_j E_j(b)(1 - f(i, j))\right)^\alpha \tag{15}$$

where A, α are model parameters, and f (i, j) represents the amount of masking, which depends on the distance of the two objects i and j. An example definition of f (i, j) can be $$f(i,j)=\cos\pi/2d(i,j)^2/\tau^2 \tag{16}$$

where d represents the distance and $\tau\in(0,1)$ is a fixed cut-off threshold.

The classic Spatial Coding methods use the Euclidean distance operated in CS-1 as the distance metric, as described in equations (1) and (2). For the HRM-preserving system, the extended hybrid distance $d_2$ defined by equation (13) is used as the distance metric, i.e., in equation (16), take:

$$d(i,j)=d_2(i,j) \tag{17}$$

where $d_2$ (i, j) is obtained by using the equation (13) while setting $\alpha_m=\tau$.

In some embodiments, the partial loudness of the object i is the sum of the specific loudness $N'_i(b)$ across auditory filters b:

$$N'_i=\Sigma_b N'_i(b) \tag{18}$$

In some embodiments, these procedures are taken for all candidate objects to determine the one with the maximum partial loudness and therefore the next cluster location. In some embodiments, if the index of the selected object is denoted by i*, the cluster position and HRM are equal to the object position $p'_i$ and HRM h [i*].

Then, the excitation of each candidate object needs to be updated according to:

$$E_i(b)=E_i(b)(1-f(i,i^*)) \tag{19}$$

In some embodiments, with the updated excitations, the partial loudness of non-selected objects will be calculated again in the next iteration according to equations (15) and (18) to select the next centroid.

Rendering an Object to Clusters Using Hybrid Distance

For each object i and clusters j=1, . . . ,J, the object-to-cluster gains $g_{i,j}$, j=1, . . . , J can be determined by minimizing a cost function, where the cost comprises several penalty terms.

In some embodiments, the first penalty term $E_P$ measures the difference of original object position and the "reconstructed" position by clusters:

$$\hat{p}_i = \sum_j g_{i,j} p_j \tag{20}$$

-continued $$E_P = \left\|\hat{p}_i - p_i \sum_j g_{i,j}\right\|^2 = \left\|\sum_j g_{i,j} p_j - \sum_j g_{i,j} p_i\right\|^2 \tag{21}$$

where $p_i$, $p_j$ and $\tilde{p}_i$ are the positional vectors of object i, cluster j, and reconstruct position of object i, respectively.

In some embodiments, the second term $E_D$ measures the "distance" between the object i and cluster j. In some embodiments, the extended hybrid distance $d'_2(i, j)$ defined in equation (14) is used and defined according to:

$$E_D=\Sigma_i g_{i,j} d'_2(i,j) \tag{22}$$

where $d'_2(i, j)$ is obtained by using the equation (14) while pre-setting $\alpha_l\in(0,1)$ as a fixed value. According to the definition of $d'_2$, this term jointly takes the Euclidean, angular and HRM distance into consideration.

The third term $E_N$ measures the loss of energy according to the sum-to-one rule:

$$E_N = \left(1 - \sum_j g_{i,j}\right)^2 \tag{23}$$

The overall cost is defined as a linear combination of the three sub-cost terms.

$$E=w_P E_P+w_D E_D+w_N E_N \tag{24}$$

where $w_P$, $w_D$ and $w_N$ are the tunable coefficients of the corresponding sub-cost terms.

Extensions

In some embodiments of the described object clustering system, the HRM distance $d_{hrm}$ (determined by the matrix M) is preset and thus fixed. However, the $d_{hrm}$ can be adaptive to different audio scenes in terms of the spatial complexity. For example, for complicated audio scenes containing a large number of sparsely distributed objects, the HRM correctness may have to be compromised to maintain the overall positional correctness. Thus, smaller $d_{hrm}$ values can be used for such cases. On the other hand, for simple scenes where most objects are distributed across only a few positions, the positional correctness can be easily maintained using a few clusters. Hence, larger $d_{hrm}$ values can be used to ensure the HRM correctness.

Figure 7:
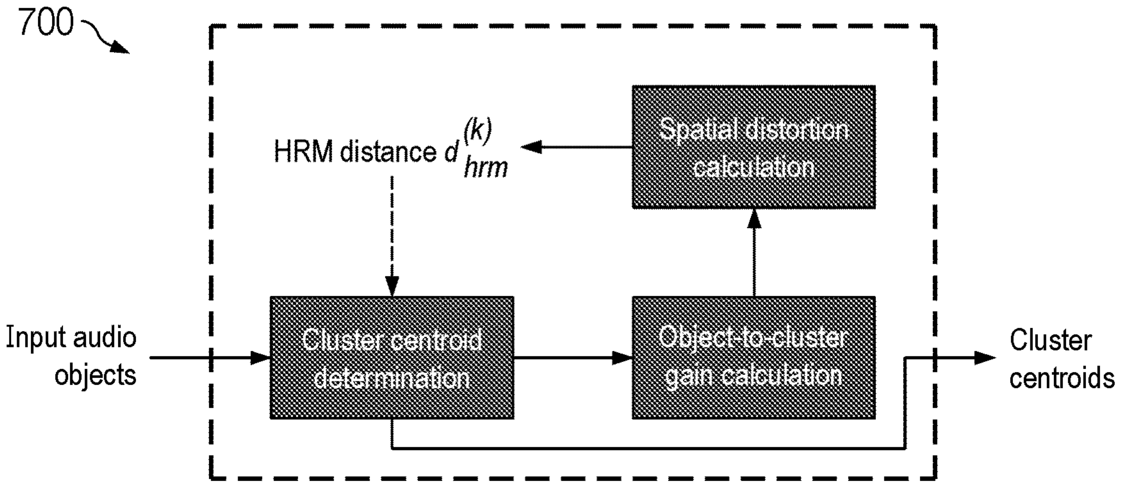
FIG. 7 is a block diagram depicting extensions of the using adaptive HRM distance.

In some embodiments, the proposed Spatial Coding framework is extended by using an adaptive HRM distance in step 1. FIG. 7 is a block diagram 700 depicting extensions of the Step 1 using adaptive HRM distance. As depicted in FIG. 7, several HRM distance candidates are preset. With each candidate HRM distance, the cluster centroids are determined. Then, the object-to-cluster gains are recalculated as per the process in step 2. Given the cluster centroids, gains and HRM distance, the spatial distortion is calculated. The definition of spatial distortion will be discussed below. When the procedures have been done for all HRM distance candidates, the final cluster centroids (as the output of step 1) can be determined as those which achieved the minimum spatial distortion using the corresponding HRM distance.

The candidate HRM distance can be set by multiplying the original HRM distance with a so-called overall masking level. Specifically, suppose the extended framework uses K HRM distance candidates, denoted by $d_{hrm}^{(k)}$, k=1, . . . , K, then they can be obtained according to:

$$d_{hrm}^{(k)}(i,j)=\min(1,\beta_k m_{u,v}) \tag{25}$$

where $\beta_k>0$ is the overall masking level. Thus, the $\beta_k$, k=1, . . . , K can be preset. A larger $\beta_k$ would lead to smaller masking amounts across different HRMs. For example, if there exists $\beta_k$ such that $d_{hrm}^{(k)}(i,j)=1$, it means any object with the HRM index u cannot be masked by the coincident object with the HRM index v. It should be noted that the $d_2(i, j)$ can be obtained accordingly by substituting $d_{hrm}^{(k)}(i, j)$ to the equation (13), which will be used for the centroid selection.

Given the selected centroids, the object-to-cluster gains $g_{i,j}$ can be obtained using the methods introduced in section 2.3. It should be noted that these gains are internally used for step 1, while the final gains will be determined in step 2 when the final cluster centroids are determined.

With the HRM distance $d_{hrm}^{(k)}(i, j)$, the distance cost can be defined according to:

$$d_c^{(k)}(i,j)=d_1(i,j)+d_{hrm}^{(k)}(i,j) \quad (26)$$

where $d_1(i,j)$ is the hybrid distance without HRM defined in equation (7). Alternatively, the relative importance of HRM over the spatial distance can be taken into consideration:

$$d_c^{(k)}(i,j)=(d_1(i,j)^2+\gamma^2(d_{hrm}^{(k)}(i,j))^2 \quad (27)$$

where $\gamma\in(0,1)$ represents the relative importance of HRM.

In some embodiments, the spatial distortion is defined by a weighted sum over all objects with considering the object loudness according to:

$$y^{(k)}=\Sigma_i\Sigma_j N'_i g_{i,j} d_c^{(k)}(i,j) \quad (28)$$

where $N'_i$ denotes the partial loudness of object i. When the $y^{(k)}$ are obtained for all 1, . . . , K, then:

$$k^*=\mathrm{argmin}_k y^{(k)} \quad (29)$$

Therefore, the final centroids are those using $d_{hrm}^{(k^*)}$.

Computing Devices and Processors

Figure 8:
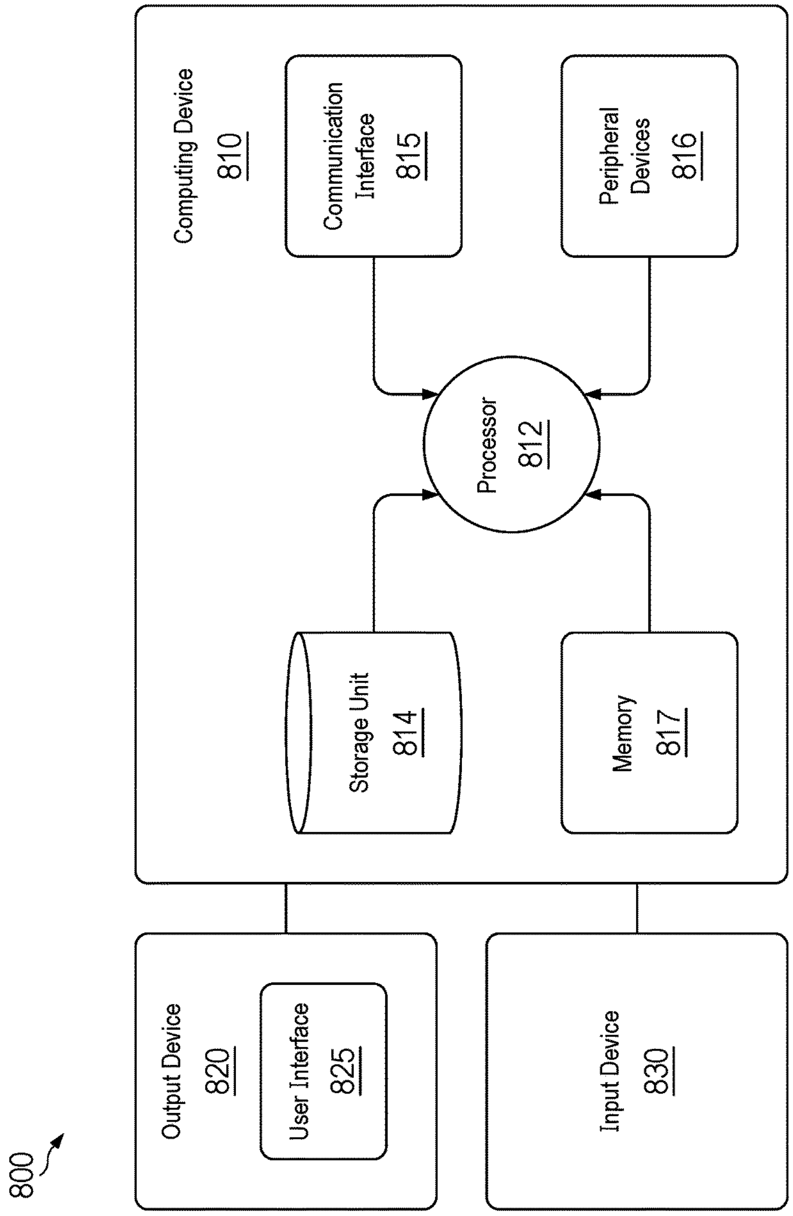
FIG. 8 depicts a block diagram of an example system that includes a computing device that can be programmed or otherwise configured to implement systems or methods of the present disclosure.

In some embodiments, the platforms, systems, media, and methods described herein are employed via a computing device, such as depicted in FIG. 8. In further embodiments, the computing device includes one or more hardware central processing units (CPUs) or general-purpose graphics processing units (GPGPUs) that carry out device functions. In still further embodiments, the computing device includes an operating system configured to perform executable instructions. In some embodiments, the computing device is optionally communicably connected to a computer network. In further embodiments, the computing device is optionally communicably connected to the Internet such that it can accesses the World Wide Web. In still further embodiments, the computing device is optionally communicably connected to a cloud computing infrastructure. In other embodiments, the computing device is optionally communicably connected to an intranet. In other embodiments, the computing device is optionally communicably connected to a data storage device.

In accordance with the description herein, suitable computing devices include, by way of non-limiting examples, server computers, desktop computers, laptop computers, notebook computers, sub-notebook computers, netbook computers, netpad computers, handheld computers, Internet appliances, mobile smartphones, tablet computers, as well as vehicles, select televisions, video players, and digital music players with optional computer network connectivity. Suitable tablet computers include those with booklet, slate, and convertible configurations.

In some embodiments, the computing device includes an operating system configured to perform executable instructions. The operating system is, for example, software, including programs and data that manages the device's hardware and provides services for execution of applications. Suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Suitable mobile smart phone operating systems include, by way of non-limiting examples, Nokia® Symbian® OS, Apple® IOS®, Research In Motion® BlackBerry OS®, Google® Android®, Microsoft® Windows Phone® OS, Microsoft® Windows Mobile® OS, Linux®, and Palm® WebOS®.

Accordingly, computing devices are provided herein that can be used to implement systems or methods of the disclosure. FIG. 8 depicts an example system 800 that includes a computer or computing device 810 that can be programmed or otherwise configured to implement systems or methods of the present disclosure. For example, the computing device 810 can be programmed or otherwise configured to preserving HRM via object clustering or compressing object-based audio data.

In the depicted embodiment, the computer or computing device 810 includes an electronic processor (also "processor" and "computer processor" herein) 812, which is optionally a single core, a multi core processor, or a plurality of processors for parallel processing. The depicted embodiment also includes memory 817 (e.g., random-access memory, read-only memory, flash memory), electronic storage unit 814 (e.g., hard disk or flash), communication interface 815 (e.g., a network adapter or modem) for communicating with one or more other systems, and peripheral devices 816, such as cache, other memory, data storage, microphones, speakers, and the like. In some embodiments, the memory 817, storage unit 814, communication interface 815 and peripheral devices 816 are in communication with the electronic processor 812 through a communication bus (shown as solid lines), such as a motherboard. In some embodiments, the bus of the computing device 810 includes multiple buses. In some embodiments, the computing device 810 includes more or fewer components than those illustrated in FIG. 8 and performs functions other than those described herein.

In some embodiments, the memory 817 and storage unit 814 include one or more physical apparatuses used to store data or programs on a temporary or permanent basis. In some embodiments, the memory 817 is volatile memory and requires power to maintain stored information. In some embodiments, the memory 817 includes, by way of non-limiting examples, flash memory, dynamic random-access memory (DRAM), ferroelectric random access memory (FRAM), or phase-change random access memory (PRAM). In some embodiments, the storage unit 814 is non-volatile memory and retains stored information when the computer is not powered. In other embodiments, the storage unit 814 includes, by way of non-limiting examples, compact disc read-only memories (CD-ROMs), digital versatile discs (DVDs), flash memory devices, magnetic disk drives, magnetic tapes drives, optical disk drives, and cloud computing-based storage. In further embodiments, memory 817 or storage unit 814 is a combination of devices such as those disclosed herein. In some embodiments, memory 817 or storage unit 814 is distributed across multiple machines such as a network-based memory or memory in multiple machines performing the operations of the computing device 810.

In some embodiments, the storage unit 814 is a data storage unit or data store for storing data. In some embodiments, the storage unit 814 store files, such as drivers, libraries, and saved programs. In some embodiments, the storage unit 814 stores user data (e.g., user preferences and user programs). In some embodiments, the computing device 810 includes one or more additional data storage units that are external, such as located on a remote server that is in communication through an intranet or the internet.

In some embodiments, methods as described herein are implemented by way of machine or computer processor executable code stored on an electronic storage location of the computing device 810, such as, for example, on the memory 817 or the storage unit 814. In some embodiments, the electronic processor 812 is configured to execute the code. In some embodiments, the machine executable or machine-readable code is provided in the form of software. In some examples, during use, the code is executed by the electronic processor 812. In some cases, the code is retrieved from the storage unit 814 and stored on the memory 817 for ready access by the electronic processor 812. In some situations, the storage unit 814 is precluded, and machine-executable instructions are stored on the memory 817. In some embodiments, the code is pre-compiled. In some embodiments, the code is compiled during runtime. The code can be supplied in a programming language that can be selected to enable the code to execute in a pre-compiled or as-compiled fashion. For example, the executable code can include an entropy coding application that performs the techniques described herein.

In some embodiments, the electronic processor 812 can execute a sequence of machine-readable instructions, which can be embodied in a program or software. The instructions may be stored in a memory location, such as the memory 817. The instructions can be directed to the electronic processor 812, which can subsequently program or otherwise configure the electronic processor 812 to implement methods of the present disclosure. Examples of operations performed by the electronic processor 812 can include fetch, decode, execute, and write back. In some embodiments, the electronic processor 812 is a component of a circuit, such as an integrated circuit. One or more other components of the computing device 810 can be optionally included in the circuit. In some embodiments, the circuit is an application specific integrated circuit (ASIC) or a field programmable gate arrays (FPGAs). In some embodiments, the operations of the electronic processor 812 can be distributed across multiple machines (where individual machines can have one or more processors) that can be coupled directly or across a network.

In some embodiments, the computing device 810 is optionally operatively coupled to a computer network via the communication interface 815. In some embodiments, the computing device 810 communicates with one or more remote computer systems through the network. For example, the computing device 810 can communicate with a remote computer system via the network. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants. In some embodiments, a user can access the computing device 810 via the network. In some embodiments, the computing device 810 is configured as a node within a peer-to-peer network.

In some embodiments, the computing device 810 includes or is in communication with one or more output devices 820. In some embodiments, the output device 820 includes a display to send visual information to a user. In some embodiments, the output device 820 is a liquid crystal display (LCD). In further embodiments, the output device 820 is a thin film transistor liquid crystal display (TFT-LCD). In some embodiments, the output device 820 is an organic light emitting diode (OLED) display. In various further embodiments, an OLED display is a passive-matrix OLED (PMOLED) or active-matrix OLED (AMOLED) display. In some embodiments, the output device 820 is a plasma display. In other embodiments, the output device 820 is a video projector. In yet other embodiments, the output device 820 is a head-mounted display in communication with the computer, such as a (virtual reality) VR headset. In further embodiments, suitable VR headsets include, by way of non-limiting examples, High Tech Computer (HTC) Vive®, Oculus Rift®, Samsung Gear VR, Microsoft HoloLens®, Razer Open-Source Virtual Reality (OSVR)®, FOVE VR, Zeiss VR One®, Avegant Glyph®, Freefly VR headset, and the like. In some embodiments, the output device 820 is a touch sensitive display that combines a display with a touch sensitive element that is operable to sense touch inputs as and functions as both the output device 820 and the input device 830. In still further embodiments, the output device 820 is a combination of devices such as those disclosed herein. In some embodiments, the output device 820 provides a user interface (UI) 825 generated by the computing device 810 (for example, software executed by the computing device 810).

In some embodiments, the computing device 810 includes or is in communication with one or more input devices 830 that are configured to receive information from a user. In some embodiments, the input device 830 is a keyboard. In some embodiments, the input device 830 is a pointing device including, by way of non-limiting examples, a mouse, trackball, track pad, joystick, game controller, or stylus. In some embodiments, as described above, the input device 830 is a touchscreen or a multi-touch screen. In other embodiments, the input device 830 is a microphone to capture voice or other sound input. In other embodiments, the input device 830 is a video camera or video camera. In still further embodiments, the input device is a combination of devices such as those disclosed herein.

In some embodiments, the computing device 810 includes an operating system configured to perform executable instructions. The operating system is, for example, software, including programs and data that manages the device's hardware and provides services for execution of applications.

It should also be noted that a plurality of hardware and software-based devices, as well as a plurality of different structural components may be used to implement the described embodiments. In addition, embodiments may include hardware, software, and electronic components or modules that, for purposes of discussion, may be illustrated and described as if the majority of the components were implemented solely in hardware. In some embodiments, the electronic based aspects of the disclosure may be implemented in software (e.g., stored on non-transitory computer-readable medium) executable by one or more processors, such as the electronic processor 812. As such, it should be noted that a plurality of hardware and software-based devices, as well as a plurality of different structural components may be employed to implement various embodiments. It should also be understood that although certain drawings illustrate hardware and software located within particular devices, these depictions are for illustrative purposes only. In some embodiments, the illustrated components may be combined or divided into separate software, firmware or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Example Processes

Figure 9:
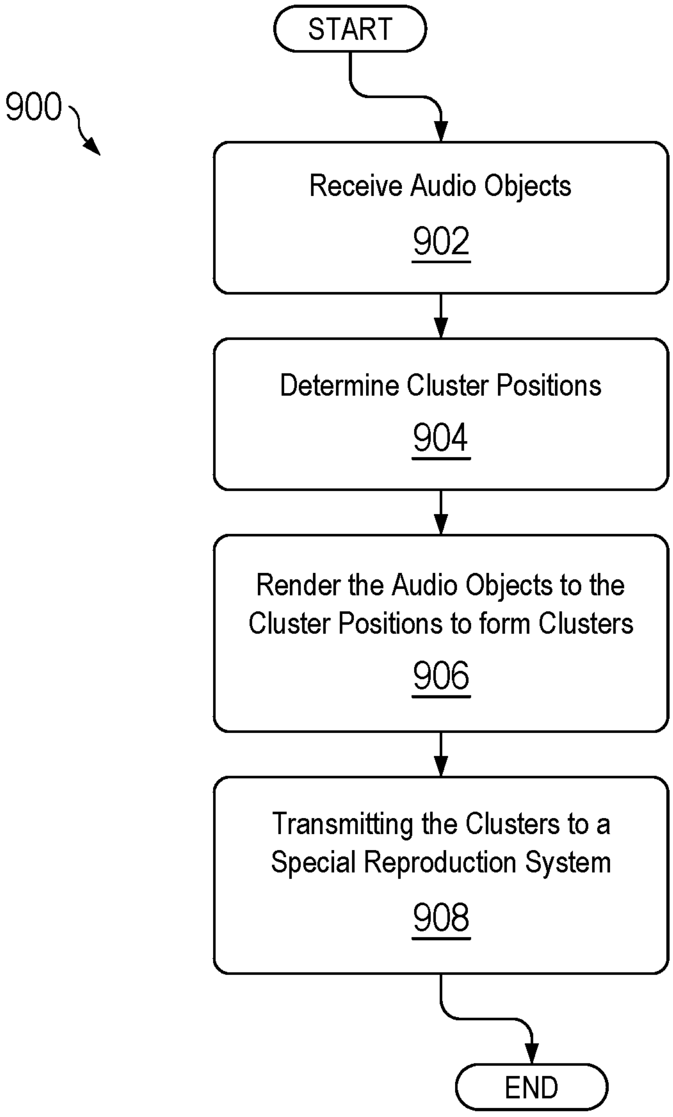
FIG. 9 depicts a flowchart of an example process according to an implementation of the present disclosure.

FIG. 9 depicts a flowchart of an example process 900 that can be implemented by embodiments of the present disclosure. The process 900 generally shows in more detail how HRM is preserved in object clustering using the described object clustering system. For clarity of presentation, the description that follows generally describes the process 900 in the context of FIG. 1-8. However, it will be understood that the process 900 may be performed, for example, by any other suitable system, environment, software, and hardware, or a combination of systems, environments, software, and hardware as appropriate. In some embodiments, various operations of the process 900 can be run in parallel, in combination, in loops, or in any order.

At 902, a plurality of audio objects is received. An audio object of the plurality of audio objects is associated with respective object metadata that indicates respective spatial position information and an HRM. In some embodiments, the HRM has a value of "bypass", "near", "far", or "middle". From 902, the process 900 proceeds to 904.

At 904, a plurality of cluster positions is determined by applying an extended hybrid distance metric to a spatial coding algorithm to calculate a partial loudness for each of the audio objects. In some embodiments, the extended hybrid distance metric integrates an HRM distance into a hybrid distance. In some embodiments, the hybrid distance combines Euclidean and angular distance. In some embodiments, a computation of the HRM distance is adaptive to different audio scenes in terms of spatial complexity. In some embodiments, the HRM distance functions as a scaling factor for calculating a distance between pairs of the audio objects when determining the cluster positions. In some embodiments, the HRM distance functions as a scaling factor for calculating a distance between each of the audio objects and each of the clusters when rendering the audio objects to the cluster positions. In some embodiments, the extended hybrid distance metric is applied to the spatial coding algorithm to ensure positional correctness and preserve the HRM. In some embodiments, the cluster positions are determined according to a target cluster count. In some embodiments, the target cluster count is set according to an available bandwidth or an expected bitrate. In some embodiments, each of the cluster positions is determined by an iterative greedy approach. In some embodiments, the iterative greedy approach includes selecting the audio object with a maximum partial loudness, overall loudness, energy, level, salience, or importance. From 904, the process 900 proceeds to 906.

At 906, the audio objects are rendered to the cluster positions to form a plurality of clusters by applying the extended hybrid distance metric to the spatial coding algorithm to calculate object-to-cluster gains. In some embodiments, an overall cost when calculating the object-to-cluster gains includes a plurality of penalty terms. In some embodiments, at least one of the penalty terms uses the extended hybrid distance metric. In some embodiments, the overall cost is defined as a linear combination of a sub-cost of each of the penalty terms. In some embodiments, the overall cost combines at least one positional distance metric describing differences in object position; a metric representing similarity or dissimilarity in HRM; and a loudness, level, or importance metric of the audio objects. In some embodiments, the audio objects are rendered to the cluster positions by minimizing the overall cost. In some embodiments, a first set of parameters is used when applying the extended hybrid distance metric to determine the cluster positions. In some embodiments, a second set of parameters is used when applying the extended hybrid distance metric to render the audio objects to the cluster positions. In some embodiments, each of the clusters includes cluster audio data and associated cluster metadata. In some embodiments, the cluster audio data is determined by applying the object-to-cluster gains to audio data of each of the audio objects rendered to the respective cluster. In some embodiments, the cluster metadata includes the cluster position of the associated cluster and a cluster HRM. In some embodiments, at least one of the object metadata associated with each of the audio objects rendered to a cluster is preserved to the respective associated cluster metadata. From 906, the process 900 proceeds to 908.

At 908, the clusters are transmitted to a spatial reproduction system. In some embodiments, the spatial reproduction system includes a number of speakers or headphones. From 908, the process 900 ends.

Implementation Mechanisms—Hardware Overview

According to one implementation, the techniques described herein are implemented by one or more special-purpose computing devices. The special-purpose computing devices may be hard-wired to perform the techniques or may include digital electronic devices such as one or more ASICs or FPGAs that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired or program logic to implement the techniques. The techniques are not limited to any specific combination of hardware circuitry and software, nor to any particular source for the instructions executed by a computing device or data processing system.

Non-Transitory Computer Readable Storage Medium

In some embodiments, the platforms, systems, media, and methods disclosed herein include one or more non-transitory computer readable storage media encoded with a program including instructions executable by the operating system of an optionally networked computer. In further embodiments, a computer readable storage medium is a tangible component of a computer. In still further embodiments, a computer readable storage medium is optionally removable from a computer.

The term "storage media" as used herein refers to any media that store data or instructions that cause a machine to operation in a specific fashion. It is non-transitory. Such storage media may comprise non-volatile media or volatile media. Non-volatile media includes, for example, optical or magnetic disks. Volatile media includes dynamic memory. Common forms of storage media include, for example, a floppy disk, a flexible disk, hard disk, solid state memory, magnetic tape drives, magnetic disk drives (or any other magnetic data storage medium), a CD-ROM, DVDs, flash memory devices, optical data storage medium, a random access memory (RAM), programmable ROM (PROM), and erasable programmable ROM (EPROM), a FLASH-EPROM, Non-Volatile RM (NVRAM), or any other memory chip or cartridge. In some cases, the program and instructions are permanently, substantially permanently, semi-permanently, or non-transitorily encoded on the media.

Storage media is distinct from but may be used in conjunction with transmission media. Transmission media participates in transferring information between storage media. For example, transmission media includes coaxial cables, copper wire and fiber optics. Transmission media can also take the form of acoustic or light waves, such as those generated during radio-wave and infra-red data communications.

Computer Program

In some embodiments, the platforms, systems, media, and methods disclosed herein include at least one computer program, or use of the same. A computer program includes a sequence of instructions, executable in the computer's CPU, written to perform a specified task. Computer readable instructions may be implemented as program modules, such as functions, objects, API, data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Data Stores

In some embodiments, the platforms, systems, media, and methods disclosed herein include one or more data stores. In view of the disclosure provided herein, those of skill in the art will recognize that data stores are repositories for persistently storing and managing collections of data. Types of data stores repositories include, for example, databases and simpler store types, or use of the same. Simpler store types include files, emails, and so forth. In some embodiments, a database is a series of bytes that is managed by a DBMS. Many databases are suitable for receiving various types of data, such as weather, maritime, environmental, civil, governmental, or military data. In various embodiments, suitable databases include, by way of non-limiting examples, relational databases, non-relational databases, object-oriented databases, object databases, entity-relationship model databases, associative databases, and extensible markup language (XML) databases. Further non-limiting examples include structured query language (SQL), PostgreSQL, MySQL®, Oracle®, DB2®, and Sybase®. In some embodiments, a database is internet-based. In some embodiments, a database is web-based. In some embodiments, a database is cloud computing based. In some embodiments, a database is based on one or more local computer storage devices.

Equivalents, Extensions, Alternatives, and Miscellaneous

In the foregoing specification, possible implementations of the present disclosure have been described with reference to numerous specific details that may vary from implementation to implementation. Any definitions expressly set forth herein for terms contained in the claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense. It should be further understood, for clarity, that exempli gratia (e.g.) means "for the sake of example" (not exhaustive), which differs from id est (i.e.) or "that is."

Additionally, in the foregoing description, numerous specific details are set forth such as examples of specific components, devices, methods, etc., in order to provide a thorough understanding of implementations of the present disclosure. It will be apparent, however, to one skilled in the art that these specific details need not be employed to practice implementations of the present disclosure. In other instances, well-known materials or methods have not been described in detail in order to avoid unnecessarily obscuring implementations of the present disclosure.

EXAMPLE CONFIGURATIONS

Various aspects of the present disclosure may take any one or more of the following example configurations:

EEE (1) A method for preserving HRM in object clustering, comprising: receiving a plurality of audio objects, wherein an audio object of the plurality of audio objects is associated with respective object metadata that indicates respective spatial position information and an HRM; determining a plurality of cluster positions by applying an extended hybrid distance metric to a spatial coding algorithm to calculate a partial loudness for each of the audio objects; rendering the audio objects to the cluster positions to form a plurality of clusters by applying the extended hybrid distance metric to the spatial coding algorithm to calculate object-to-cluster gains; and transmitting the clusters to a spatial reproduction system.

EEE (2) The method for preserving headphone rendering mode in object clustering according to EEE (1), wherein the extended hybrid distance metric integrates an HRM distance into a hybrid distance.

EEE (3) The method for preserving headphone rendering mode in object clustering according to any one of EEE (1) or EEE (2), wherein the hybrid distance combines Euclidean and angular distance.

EEE (4) The method for preserving headphone rendering mode in object clustering according to any one of EEE (1) to EEE (3), wherein a computation of the HRM distance is adaptive to different audio scenes in terms of spatial complexity.

EEE (5) The method for preserving headphone rendering mode in object clustering according to any one of EEE (1) to EEE (4), wherein the HRM distance functions as a scaling factor for calculating a distance between pairs of the audio objects when determining the cluster positions, and wherein the HRM distance functions as a scaling factor for calculating a distance between each of the audio objects and each of the clusters when rendering the audio objects to the cluster positions.

EEE (6) The method for preserving headphone rendering mode in object clustering according to any one of EEE (1) to EEE (5), wherein the extended hybrid distance metric is applied to the spatial coding algorithm to ensure positional correctness and preserve the HRM.

EEE (7) The method for preserving headphone rendering mode in object clustering according to any one of EEE (1) to EEE (6), wherein an overall cost when calculating the object-to-cluster gains includes a plurality of penalty terms, and wherein at least one of the penalty terms uses the extended hybrid distance metric.

EEE (8) The method for preserving headphone rendering mode in object clustering according to any one of EEE (1) to EEE (7), wherein the overall cost is defined as a linear combination of a sub-cost of each of the penalty terms, and wherein the overall cost combines at least one positional distance metric describing differences in object position; a metric representing similarity or dissimilarity in HRM; and a loudness, level, or importance metric of the audio objects.

EEE (9) The method for preserving headphone rendering mode in object clustering according to any one of EEE (1) to EEE (8), wherein the audio objects are rendered to the cluster positions by minimizing the overall cost.

EEE (10) The method for preserving headphone rendering mode in object clustering according to any one of EEE (1) to EEE (9), wherein a first set of parameters is used when applying the extended hybrid distance metric to determine the cluster positions, and wherein a second set of parameters is used when applying the extended hybrid distance metric to render the audio objects to the cluster positions.

EEE (11) The method for preserving headphone rendering mode in object clustering according to any one of EEE (1) to EEE (10), wherein the cluster positions are determined according to a target cluster count, and wherein the target cluster count is set according to an available bandwidth or an expected bitrate.

EEE (12) The method for preserving headphone rendering mode in object clustering according to any one of EEE (1) to EEE (11), wherein each of the cluster positions is determined by an iterative greedy approach.

EEE (13) The method for preserving headphone rendering mode in object clustering according to any one of EEE (1) to EEE (12), wherein the iterative greedy approach includes selecting the audio object with a maximum partial loudness, overall loudness, energy, level, salience, or importance.

EEE (14) The method for preserving headphone rendering mode in object clustering according to any one of EEE (1) to EEE (13), wherein each of the clusters includes cluster audio data and associated cluster metadata.

EEE (15) The method for preserving headphone rendering mode in object clustering according to any one of EEE (1) to EEE (14), wherein the cluster audio data is determined by applying the object-to-cluster gains to audio data of each of the audio objects rendered to the respective cluster.

EEE (16) The method for preserving headphone rendering mode in object clustering according to any one of EEE (1) to EEE (15), wherein the cluster metadata includes the cluster position of the associated cluster and a cluster HRM.

EEE (17) The method for preserving headphone rendering mode in object clustering according to any one of EEE (1) to EEE (16), wherein at least one of the object metadata associated with each of the audio objects rendered to a cluster is preserved to the respective associated cluster metadata.

EEE (18) The method for preserving headphone rendering mode in object clustering according to any one of EEE (1) to EEE (17), wherein the HRM has a value of “bypass”, “near”, “far”, or “middle”.

EEE (19) The method for preserving headphone rendering mode in object clustering according to any one of EEE (1) to EEE (18), wherein the spatial reproduction system includes a number of speakers or headphones.

EEE (20) A non-transitory computer-readable storage media coupled to an electronic processor and having instructions stored thereon which, when executed by the electronic processor, cause the electronic processor to perform operations comprising: receiving a plurality of audio objects, wherein an audio object of the plurality of audio objects is associated with respective object metadata that indicates respective spatial position information and an HRM; determining a plurality of cluster positions by applying an extended hybrid distance metric to a spatial coding algorithm to calculate a partial loudness for each of the audio objects; rendering the audio objects to the cluster positions to form a plurality of clusters by applying the extended hybrid distance metric to the spatial coding algorithm to calculate object-to-cluster gains; and transmitting the clusters to a spatial reproduction system.

EEE (21) The media according to EEE (20), wherein the extended hybrid distance metric integrates an HRM distance into a hybrid distance.

EEE (22) The media according to any one of EEE (20) or EEE (21), wherein the hybrid distance combines Euclidean and angular distance.

EEE (23) The media according to any one of EEE (20) to EEE (22), wherein a computation of the HRM distance is adaptive to different audio scenes in terms of spatial complexity.

EEE (24) The media according to any one of EEE (20) to EEE (23), wherein the HRM distance functions as a scaling factor for calculating a distance between pairs of the audio objects when determining the cluster positions, and wherein the HRM distance functions as a scaling factor for calculating a distance between each of the audio objects and each of the clusters when rendering the audio objects to the cluster positions.

EEE (25) The media according to any one of EEE (20) to EEE (24), wherein the extended hybrid distance metric is applied to the spatial coding algorithm to ensure positional correctness and preserve the HRM.

EEE (26) The media according to any one of EEE (20) to EEE (25), wherein an overall cost when calculating the object-to-cluster gains includes a plurality of penalty terms, and wherein at least one of the penalty terms uses the extended hybrid distance metric.

EEE (27) The media according to any one of EEE (20) to EEE (26), wherein the overall cost is defined as a linear combination of a sub-cost of each of the penalty terms, and wherein the overall cost combines at least one positional distance metric describing differences in object position; a metric representing similarity or dissimilarity in HRM; and a loudness, level, or importance metric of the audio objects.

EEE (28) The media according to any one of EEE (20) to EEE (27), wherein the audio objects are rendered to the cluster positions by minimizing the overall cost.

EEE (29) The media according to any one of EEE (20) to EEE (28), wherein a first set of parameters is used when applying the extended hybrid distance metric to determine the cluster positions, and wherein a second set of parameters is used when applying the extended hybrid distance metric to render the audio objects to the cluster positions.

EEE (30) The media according to any one of EEE (20) to EEE (29), wherein the cluster positions are determined according to a target cluster count, and wherein the target cluster count is set according to an available bandwidth or an expected bitrate.

EEE (31) The media according to any one of EEE (20) to EEE (30), wherein each of the cluster positions is determined by an iterative greedy approach.

EEE (32) The media according to any one of EEE (20) to EEE (31), wherein the iterative greedy approach includes selecting the audio object with a maximum partial loudness, overall loudness, energy, level, salience, or importance.

EEE (33) The media according to any one of EEE (20) to EEE (32), wherein each of the clusters includes cluster audio data and associated cluster metadata.

EEE (34) The media according to any one of EEE (20) to EEE (33), wherein the cluster audio data is determined by applying the object-to-cluster gains to audio data of each of the audio objects rendered to the respective cluster.

EEE (35) The media according to any one of EEE (20) to EEE (34), wherein the cluster metadata includes the cluster position of the associated cluster and a cluster HRM.

EEE (36) The media according to any one of EEE (20) to EEE (35), wherein at least one of the object metadata associated with each of the audio objects rendered to a cluster is preserved to the respective associated cluster metadata.

EEE (37) The media according to any one of EEE (20) to EEE (36), wherein the HRM has a value of "bypass", "near", "far", or "middle".

EEE (38) The media according to any one of EEE (20) to EEE (37), wherein the spatial reproduction system includes a number of speakers or headphones.

EEE (39) An object-based audio data processing system comprising: a processor configured to: receive a plurality of audio objects, wherein an audio object of the plurality of audio objects is associated with respective object metadata that indicates respective spatial position information and a headphone rendering mode (HRM); determine a plurality of cluster positions by applying an extended hybrid distance metric to a spatial coding algorithm to calculate a partial loudness for each of the audio objects; render the audio objects to the cluster positions to form a plurality of clusters by applying the extended hybrid distance metric to the spatial coding algorithm to calculate object-to-cluster gains; and transmit the clusters to a spatial reproduction system.

EEE (40) The object-based audio data processing system according to EEE (39), wherein the extended hybrid distance metric integrates an HRM distance into a hybrid distance.

EEE (41) The object-based audio data processing system according to any one of EEE (39) or EEE (40), wherein the hybrid distance combines Euclidean and angular distance.

EEE (42) The object-based audio data processing system according to any one of EEE (39) to EEE (41), wherein a computation of the HRM distance is adaptive to different audio scenes in terms of spatial complexity.

EEE (43) The object-based audio data processing system according to any one of EEE (39) to EEE (42), wherein the HRM distance functions as a scaling factor for calculating a distance between pairs of the audio objects when determining the cluster positions, and wherein the HRM distance functions as a scaling factor for calculating a distance between each of the audio objects and each of the clusters when rendering the audio objects to the cluster positions.

EEE (44) The object-based audio data processing system according to any one of EEE (39) to EEE (43), wherein the extended hybrid distance metric is applied to the spatial coding algorithm to ensure positional correctness and preserve the HRM.

EEE (45) The object-based audio data processing system according to any one of EEE (39) to EEE (44), wherein an overall cost when calculating the object-to-cluster gains includes a plurality of penalty terms, and wherein at least one of the penalty terms uses the extended hybrid distance metric.

EEE (46) The object-based audio data processing system according to any one of EEE (39) to EEE (45), wherein the overall cost is defined as a linear combination of a sub-cost of each of the penalty terms, and wherein the overall cost combines at least one positional distance metric describing differences in object position; a metric representing similarity or dissimilarity in HRM; and a loudness, level, or importance metric of the audio objects.

EEE (47) The object-based audio data processing system according to any one of EEE (39) to EEE (46), wherein the audio objects are rendered to the cluster positions by minimizing the overall cost.

EEE (48) The object-based audio data processing system according to any one of EEE (39) to EEE (47), wherein a first set of parameters is used when applying the extended hybrid distance metric to determine the cluster positions, and wherein a second set of parameters is used when applying the extended hybrid distance metric to render the audio objects to the cluster positions.

EEE (49) The object-based audio data processing system according to any one of EEE (39) to EEE (48), wherein the cluster positions are determined according to a target cluster count, and wherein the target cluster count is set according to an available bandwidth or an expected bitrate.

EEE (50) The object-based audio data processing system according to any one of EEE (39) to EEE (49), wherein each of the cluster positions is determined by an iterative greedy approach.

EEE (51) The object-based audio data processing system according to any one of EEE (39) to EEE (50), wherein the iterative greedy approach includes selecting the audio object with a maximum partial loudness, overall loudness, energy, level, salience, or importance.

EEE (52) The object-based audio data processing system according to any one of EEE (39) to EEE (51), wherein each of the clusters includes cluster audio data and associated cluster metadata.

EEE (53) The object-based audio data processing system according to any one of EEE (39) to EEE (52), wherein the cluster audio data is determined by applying the object-to-cluster gains to audio data of each of the audio objects rendered to the respective cluster.

EEE (54) The object-based audio data processing system according to any one of EEE (39) to EEE (53), wherein the cluster metadata includes the cluster position of the associated cluster and a cluster HRM.

EEE (55) The object-based audio data processing system according to any one of EEE (39) to EEE (54), wherein at least one of the object metadata associated with each of the audio objects rendered to a cluster is preserved to the respective associated cluster metadata.

EEE (56) The object-based audio data processing system according to any one of EEE (39) to EEE (55), wherein the HRM has a value of “bypass”, “near”, “far”, or “middle”.

EEE (57) The object-based audio data processing system according to any one of EEE (39) to EEE (56), wherein the spatial reproduction system includes a number of speakers or headphones.

What is claimed is:

1. A method for preserving headphone rendering mode (HRM) in object clustering, comprising:

receiving a plurality of audio objects, wherein an audio object of the plurality of audio objects is associated with respective object metadata that indicates respective spatial position information and an HRM;

determining a plurality of cluster positions by applying an extended hybrid distance metric to a spatial coding algorithm to calculate a partial loudness for each of the audio objects;

rendering the audio objects to the cluster positions to form a plurality of clusters by applying the extended hybrid distance metric to the spatial coding algorithm to calculate object-to-cluster gains; and transmitting the clusters to a spatial reproduction system, wherein the extended hybrid distance metric comprises a combination of a hybrid distance and an HRM distance, wherein the hybrid distance comprises a combination of Euclidean and angular distance, and wherein the HRM distance comprises either a distance between pairs of the audio objects when determining the cluster positions, or a distance between each of the audio objects and each of the clusters when rendering the audio objects to the cluster positions.

2. The method of claim 1, wherein a computation of the HRM distance is adaptive to different audio scenes in terms of spatial complexity.

3. The method of claim 1, wherein the HRM distance is scaled by either a first scaling factor or a second scaling factor in the extended hybrid distance metric, wherein the first scaling factor is used for calculating the distance between pairs of the audio objects when determining the cluster positions, and wherein the second scaling factor is used for calculating the distance between each of the audio objects and each of the clusters when rendering the audio objects to the cluster positions.

4. The method of claim 1, wherein the extended hybrid distance metric is applied to the spatial coding algorithm to ensure positional correctness and preserve the HRM.

5. The method of claim 1, wherein an overall cost when calculating the object-to-cluster gains includes a plurality of penalty terms, and wherein at least one of the penalty terms uses the extended hybrid distance metric.

6. The method of claim 5, wherein the overall cost is defined as a linear combination of a sub-cost of each of the penalty terms, and wherein the overall cost combines at least one positional distance metric describing differences in object position; a metric representing similarity or dissimilarity in HRM; and a loudness, level, or importance metric of the audio objects.

7. The method of claim 5, wherein the audio objects are rendered to the cluster positions by minimizing the overall cost.

8. The method of claim 1, wherein a first set of parameters is used when applying the extended hybrid distance metric to determine the cluster positions, and wherein a second set of parameters is used when applying the extended hybrid distance metric to render the audio objects to the cluster positions.

9. The method of claim 1, wherein the cluster positions are determined according to a target cluster count, and wherein the target cluster count is set according to an available bandwidth or an expected bitrate.

10. The method of claim 1, wherein each of the cluster positions is determined by an iterative greedy approach.

11. The method of claim 10, wherein the iterative greedy approach includes selecting the audio object with a maximum partial loudness, overall loudness, energy, level, salience, or importance.

12. The method of claim 1, wherein each of the clusters includes cluster audio data and associated cluster metadata.

13. The method of claim 12, wherein the cluster audio data is determined by applying the object-to-cluster gains to audio data of each of the audio objects rendered to the respective cluster.

14. The method of claim 12, wherein the cluster metadata includes the cluster position of the associated cluster and a cluster HRM.

15. The method of claim 12, wherein at least one of the object metadata associated with each of the audio objects rendered to a cluster is preserved to the respective associated cluster metadata.

16. The method of claim 1, wherein the HRM has a value of “bypass”, “near”, “far”, or “middle”.

17. The method of claim 1, wherein the spatial reproduction system includes a number of speakers or headphones.

18. A non-transitory computer-readable storage media coupled to an electronic processor and having instructions stored thereon which, when executed by the electronic processor, cause the electronic processor to perform operations comprising:

receiving a plurality of audio objects, wherein an audio object of the plurality of audio objects is associated with respective object metadata that indicates respective spatial position information and a headphone rendering mode (HRM);

determining a plurality of cluster positions by applying an extended hybrid distance metric to a spatial coding algorithm to calculate a partial loudness for each of the audio objects;

rendering the audio objects to the cluster positions to form a plurality of clusters by applying the extended hybrid distance metric to the spatial coding algorithm to calculate object-to-cluster gains; and transmitting the clusters to a spatial reproduction system, wherein the extended hybrid distance metric comprises a combination of a hybrid distance and an HRM distance, wherein the hybrid distance comprises a combination of Euclidean and angular distance, and wherein the HRM distance comprises either a distance between pairs of the audio objects when determining the cluster positions, or a distance between each of the audio objects and each of the clusters when rendering the audio objects to the cluster positions.

19. An object-based audio data processing system comprising:

a processor configured to:

receive a plurality of audio objects, wherein an audio object of the plurality of audio objects is associated with respective object metadata that indicates respective spatial position information and a headphone rendering mode (HRM);

determine a plurality of cluster positions by applying an extended hybrid distance metric to a spatial coding algorithm to calculate a partial loudness for each of the audio objects;

render the audio objects to the cluster positions to form a plurality of clusters by applying the extended hybrid distance metric to the spatial coding algorithm to calculate object-to-cluster gains; and transmit the clusters to a spatial reproduction system, wherein the extended hybrid distance metric comprises a combination of a hybrid distance and an HRM distance, wherein the hybrid distance comprises a combination of Euclidean and angular distance, and wherein the HRM distance comprises either a distance between pairs of the audio objects when determining the cluster positions, or a distance between each of the audio objects and each of the clusters when rendering the audio objects to the cluster positions.

* * * * *